US010161552B2

(12) United States Patent
Tiberghien et al.

(10) Patent No.: US 10,161,552 B2
(45) Date of Patent: Dec. 25, 2018

(54) COAXIAL FLUID CONNECTOR

(71) Applicant: STAUBLI FAVERGES, Faverges (FR)

(72) Inventors: Alain-Christophe Tiberghien, Sevrier (FR); Christophe Durieux, Gilly sur Isere (FR); Romain Mayer, Hery sur Ugine (FR)

(73) Assignee: STAUBLI FAVERGES, Faverges (FR)

(*) Notice: Subject to any disclaimer, the term of this patent is extended or adjusted under 35 U.S.C. 154(b) by 0 days.

(21) Appl. No.: 15/520,040

(22) PCT Filed: Nov. 30, 2015

(86) PCT No.: PCT/EP2015/078007
§ 371 (c)(1),
(2) Date: Apr. 18, 2017

(87) PCT Pub. No.: WO2016/071536
PCT Pub. Date: May 12, 2016

(65) Prior Publication Data
US 2017/0350548 A1  Dec. 7, 2017

(30) Foreign Application Priority Data
Dec. 1, 2014 (FR) ...................................... 14 61715

(51) Int. Cl.
*F16L 37/34* (2006.01)
*F16L 37/35* (2006.01)
*F16L 37/56* (2006.01)

(52) U.S. Cl.
CPC ............... *F16L 37/34* (2013.01); *F16L 37/35* (2013.01); *F16L 37/565* (2013.01); *Y10T 137/87957* (2015.04)

(58) Field of Classification Search
CPC ......... F16L 37/34; F16L 37/35; F16L 37/413; F16L 37/32; F16L 37/23; F16L 37/565;
(Continued)

(56) References Cited

U.S. PATENT DOCUMENTS 6,179,001 B1   1/2001  Schutz
8,387,949 B2 *  3/2013  Ekstrom ............... F16L 37/252
                                                  137/614.03
(Continued)

FOREIGN PATENT DOCUMENTS

EP       0074991        3/1983
WO   2014058461 A1      4/2014

OTHER PUBLICATIONS

International Search Report, PCT/EP2015/078007, dated Feb. 3, 2016, 3 pages.

*Primary Examiner* — Michael R Reid

(57) ABSTRACT

A fluid connector for removably joining two lines includes a male element and a complementary female element, which each include a body defining an inner passage and an outer passage, a male drawer, which is axially movable inside the outer passage between an uncoupled position of the connector, where it tightly closes off a distal mouth of the outer passage, and a coupled position, where it does not oppose the passage of fluid in the mouth and wherein the male or female body delimits a connecting passage between the outer passage of the female element and the outer passage of the male element during the coupling of the elements and which connecting passage extends between at least one distal opening and at least one proximal opening, which each emerge in one or the other of the outer passages.

16 Claims, 14 Drawing Sheets

Figure 1:
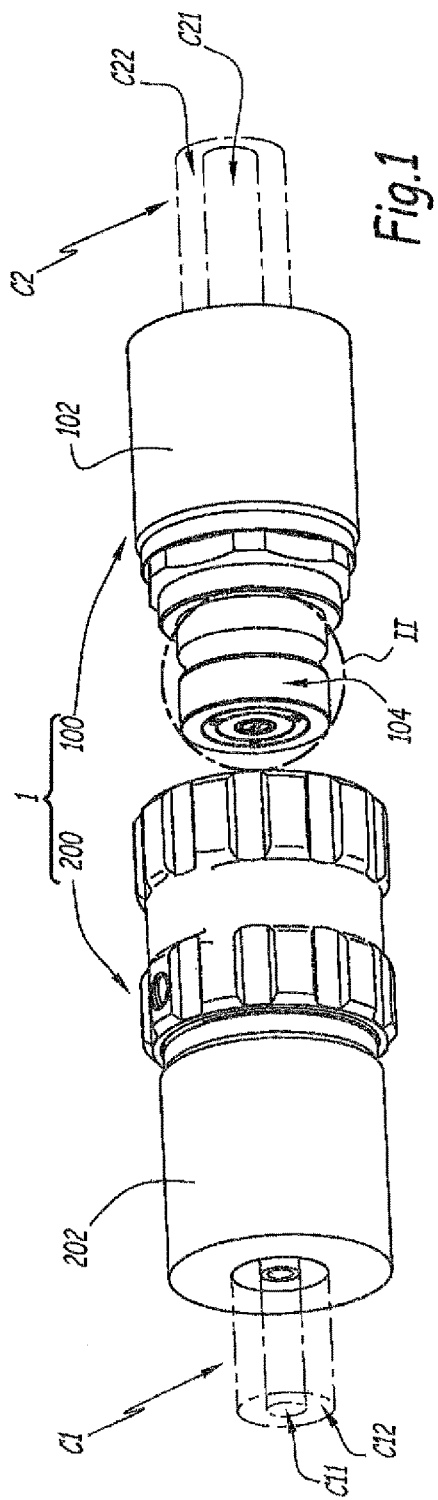

(58) Field of Classification Search
CPC ..... Y10T 137/87933; Y10T 137/87941; Y10T 137/8949; Y10T 137/8795; Y10T 137/87965; Y10T 137/87957
USPC ........................................ 137/614.01–614.05
See application file for complete search history.

(56) References Cited

U.S. PATENT DOCUMENTS

| | | |
|---|---|---|
| 8,602,056 B2 | 12/2013 | Christian Schutz et al. |
| 9,512,948 B2 * | 12/2016 | Nowack .................. F16L 37/32 |
| 2004/0244848 A1 * | 12/2004 | Maldavs ................ F16L 37/34 137/614.04 |
| 2007/0102050 A1 | 5/2007 | Maldays |
| 2015/0233511 A1 | 8/2015 | Lemay et al. |

* cited by examiner

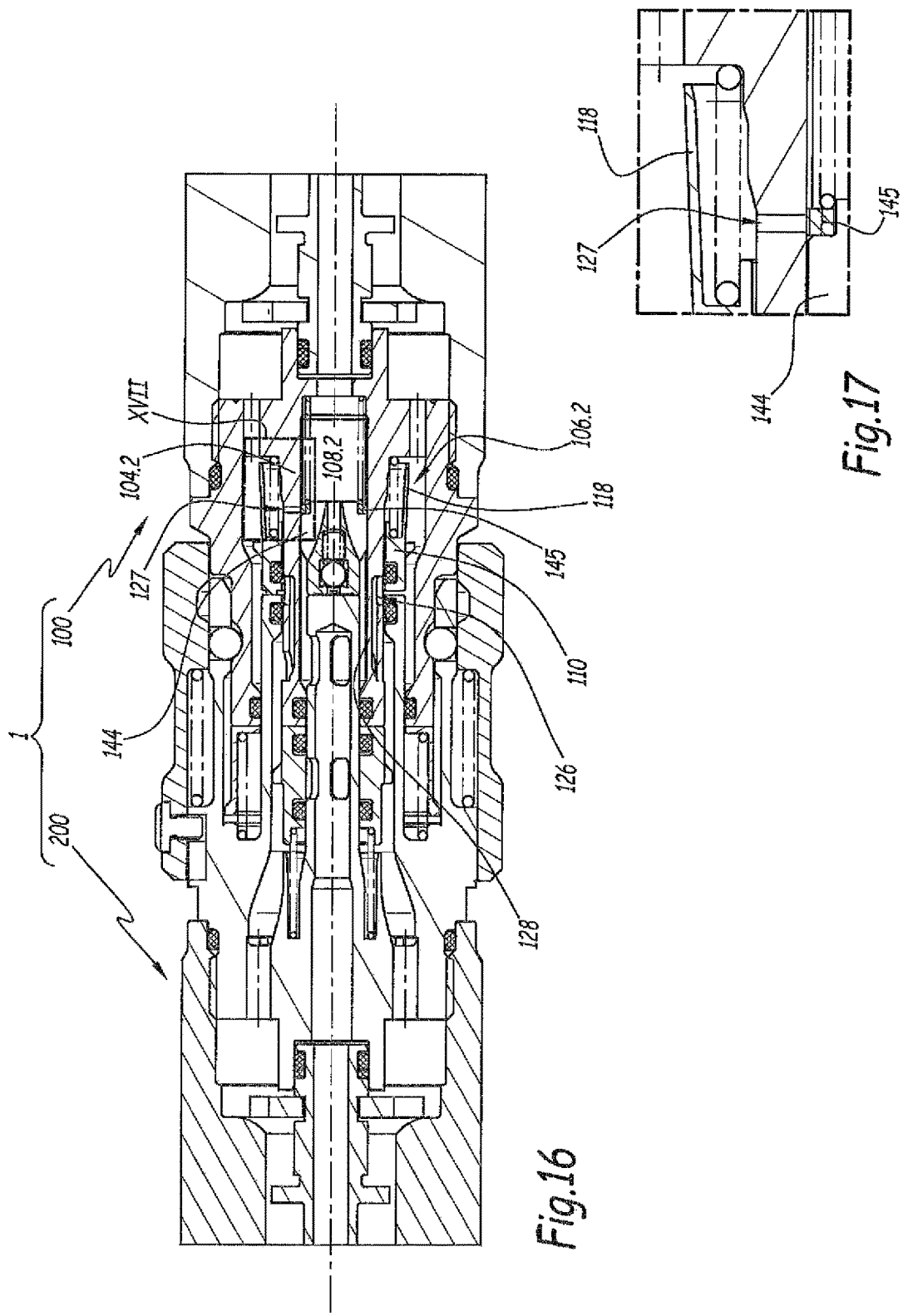

COAXIAL FLUID CONNECTOR

The invention relates to a coaxial fluid connector for connecting supply and discharge lines of a hydraulic tool to a hydraulic pump. In particular, the invention is applicable in the field of line connectors for emergency devices.

During emergency operations on an accident site, the operating teams use hydraulic extrication devices that are connected to a distribution unit by pipes connected end-to-end. These pipes supply the devices with pressurized oil from a hydraulic pump and also bring the low-pressure discharged oil to a reservoir of the pump. In practice, the connection of the connector is done under pressure, i.e., there is an operating pressure in the supply and discharge ducts.

EP-B-1,629,230 discloses a connector for ducts with a coaxial structure, i.e., that define an inner fluid passage and an outer fluid passage positioned around the inner passage. This connector comprises a male element and a complementary female element. The male and female elements each include a body, formed by two coaxial parts, that define an inner passage and an outer passage for fluid. During the coupling of the male element with the female element, the inner and outer passages of the male element are respectively placed in communication with the inner and outer passages of the female element. The male and female element each include an axially movable drawer inside their respective outer passage. The male and female drawers close off the outer passage of the male and female elements in the uncoupled position. During coupling, the male and female drawers are respectively pushed by the female body and the male body and no longer oppose the flow of the fluid in the outer passage of the connector.

In order to ensure tight contact in the uncoupled position, the female drawer includes inner and outer sealing gaskets. These seals are in tight contact with the inner and outer coaxial parts of the female body in the uncoupled position. Conversely, the outer radial seal is directly exposed to the fluid flowing in the outer passage in the coupled position of the connector. The same problem arises with the male body, which also includes inner and outer sealing gaskets provided to cooperate with a fixed core and the male drawer in the uncoupled position, respectively, so as to close off the outer passage of the male element. In fact, in the coupled position of the connector, the outer seal of the male body is directly exposed to the fluid flowing in the outer passage.

Figure 3:
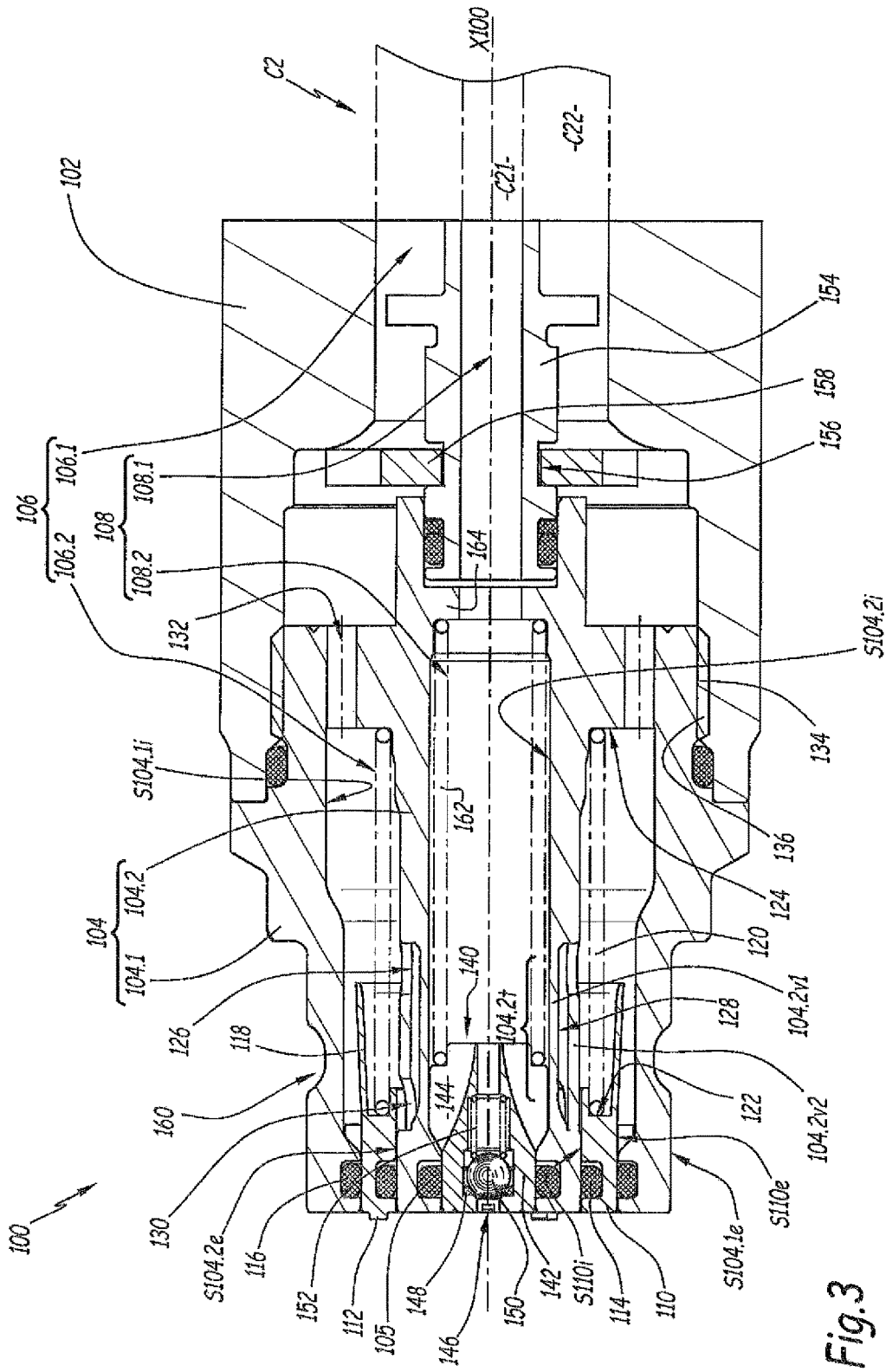

EP-B-0,074,991 discloses a connector having the same drawbacks. This connector includes a male element having an outer tube, inside which a hollow core is positioned. The hollow core delimits an inner fluid passage. An outer fluid passage is delimited between the core and the outer tube. A male ring is axially movable inside the outer passage. This ring includes a sealing gasket, which is in tight contact against a seat in the uncoupled position of the connector. During coupling, the ring is pushed back by an inner tube of the female element, inside which an inner fluid passage is defined and around which an outer fluid passage is defined. This inner female tube also comprises an outer sealing gasket that cooperates with a peripheral seat so as to close off the outer female passage in the uncoupled position. However, as shown in FIG. 3, in the coupled position, the respective seals of the male ring and the inner female tube are exposed to the fluid flow in the outer passage.

The exposure of the sealing gaskets to the passage of the fluid in the outer tunnel of the connector causes accelerated deterioration of the seals, in particular at high flow rates and/or high pressures. A seal risks being expelled from its housing under the pressure of the fluid. This can therefore cause tightness problems and closing problems once the connector is uncoupled, related to the incorrect repositioning of the seals. In the case of hoses supplied with pressurized oil, the spilling of oil can cause a fire, since the oil can ignite on the accident site.

The invention more particularly aims to resolve these drawbacks by proposing a fluid connector in which the sealing gaskets of the male and female elements are exposed little or not at all to the flow of the fluid in the outer passage of the connector in the coupled position.

To that end, the invention relates to a fluid connector for removably joining two lines, comprising a male element that includes:
  a male body defining an inner passage and an outer passage, and
  a male drawer, which is axially movable inside the outer passage between an uncoupled position of the connector, where it tightly closes off a distal mouth of the outer passage, and a coupled position, where it does not oppose the passage of fluid in the mouth,
and a complementary female element that includes:
  a female body, comprising two coaxial parts defining an inner passage and an outer passage, and
  a female drawer, which is axially movable inside the outer passage between an uncoupled position of the connector, where it tightly closes off the distal mouth of the outer passage, and a coupled position, where it does not oppose the passage of the fluid in the mouth, the male drawer and the female drawer respectively being pushed by the female body and by the male body during coupling.

According to the invention:
  the male body delimits a connecting passage between the outer passage of the female element and the outer passage of the male element during the coupling of the elements, the connecting passage extending between at least one distal opening and at least one proximal opening, which are delimited in an inner coaxial part of the male body and which each emerge in the outer passage of the male element,
  the male drawer includes, on an inner surface, an inner sealing gasket that bears against the outer surface of the inner coaxial part of the male body in the coupled and uncoupled positions,
  in the uncoupled position, the inner sealing gasket bears on the male body in front of each distal opening, and
  in the uncoupled position, the inner sealing gasket bears on the male body behind each distal opening,
or:
  the female body delimits a connecting passage between the outer passage of the female element and the outer passage of the male element during the coupling of the elements, the connecting passage extending between at least one distal opening and at least one proximal opening, which are delimited in an outer coaxial part of the female body and which each emerge in the outer passage of the female element,
  the female drawer includes, on an outer surface, an outer sealing gasket that bears against an inner surface of the outer coaxial part of the female body in the coupled and uncoupled positions,
  in the uncoupled position, the outer sealing gasket bears on the female body in front of each distal opening, and
  in the coupled position, the outer sealing gasket bears on the female body behind each distal opening.

Owing to the invention, the sealing gasket of the male or female drawer, which ensures tightness with the body of the male or female element in the uncoupled position, is located behind each distal opening in the coupled position, such that it is not exposed to the fluid flowing in the outer passage of the male and female elements in the coupled position. This seal in fact bears on an outer surface of the inner part of the male body or on an inner surface of the outer part of the female body, depending on the embodiment. It is therefore protected by the walls of the male body or the female body in the coupled position. More generally, all of the sealing gaskets used to achieve tightness of the outer passage are protected from the passage of fluid in the coupled position. The risk of leakage in the uncoupled position is therefore limited.

According to advantageous, but optional aspects of the invention, such a coupling may include one or more of the following features, considered in any technically allowable combination:

During coupling and separation, the inner sealing gasket of the inner surface of the male drawer in contact with the outer surface of the inner part of the male body, or the outer sealing gasket of the outer surface of the female drawer, is in contact with the inner surface of the outer part of the female body.

The outer coaxial part of the female body has a distal part equipped, on its inner face, with a sealing gasket that is in contact with the male body in the coupled position, between the proximal and distal openings.

In the coupled position, the male drawer and the female body form, at their front face, a radial fluid passage between the outer passage of the male element and the connecting passage.

The front face of the male drawer includes contact lugs with the front face of the female body, while the radial fluid passage extends preferably between the lugs.

The front face of the female body includes contact lugs with the front face of the male drawer, while the radial fluid passage extends peripherally between the lugs.

In the coupled position, the inner sealing gasket of the male drawer bears on the male body behind each distal opening and in front of each proximal opening, while the outer passage of the male element extends inside the male drawer toward the connecting passage.

The inner coaxial part of the female body is provided with at least one distal radial opening able to place the inner passage of the male element in communication with the inner passage of the female element in the coupled position.

The inner coaxial part of the female body is provided with at least one proximal radial opening relative to the distal opening, able to put the inner and outer passages of the female element in communication in the uncoupled position.

During coupling, the female drawer closes off the or each proximal radial opening of the inner coaxial part of the female body and frees the or each distal radial opening of the inner coaxial part of the female body.

The inner coaxial part of the female body is provided with at least one opening, able to place the inner and outer passages of the female element in communication in the uncoupled position and place the inner passages of the two connector elements in communication in the coupled position.

The male and female elements are each provided to be connected to a coaxial fluid passage tube.

The inner passage is a high-pressure fluid passage, while the outer passage is a low-pressure fluid passage.

The male element further comprises a central valve movable in the inner passage of the male element and having a valve body, the valve body being in tight contact with the male body in the uncoupled position, and the tight contact between the valve body and the male body being broken upon coupling.

The male element is equipped with a bleed member, which is elastically kept in tight contact against a distal mouth of the inner passage and which is accessible from the outside environment to free the inner passage to the outside.

The inner coaxial part of the male body defines at least one proximal depressurization passage able to put the inner and outer passages of the male element in communication in the uncoupled position of the connector.

The depressurization passage emerges in the connecting passage defined by the male body.

The male element further comprises a central valve movable in the inner passage of the male element and the central valve closes off the depressurization passage in the coupled position of the connector.

Figure 2:
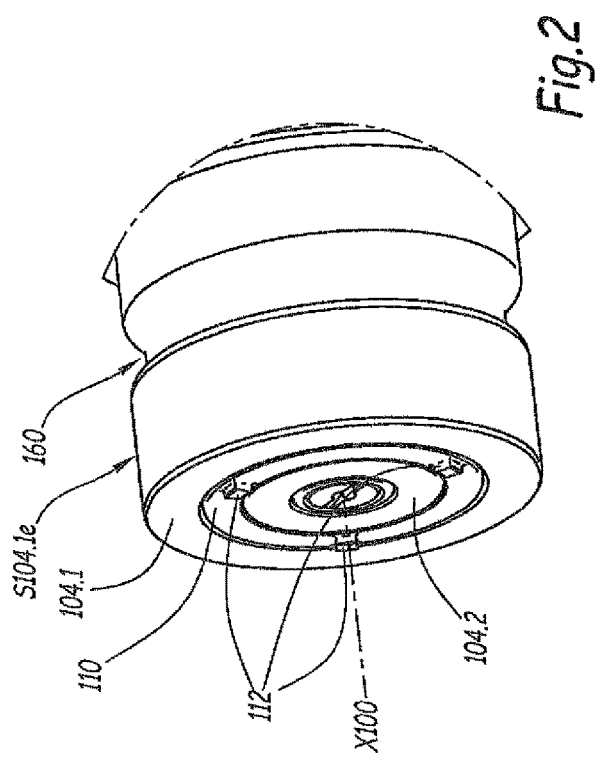
Figure 4:
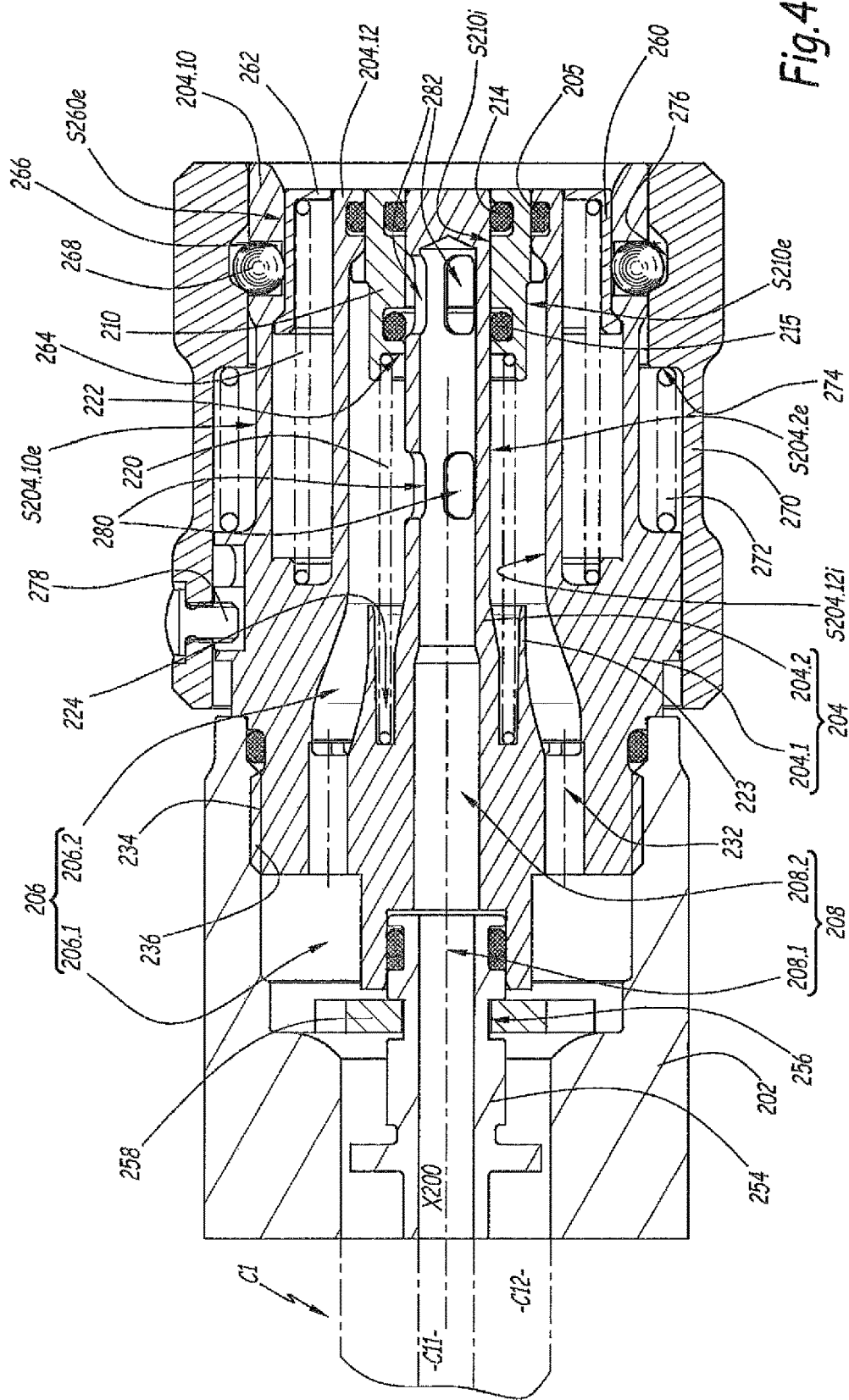
Figure 5:
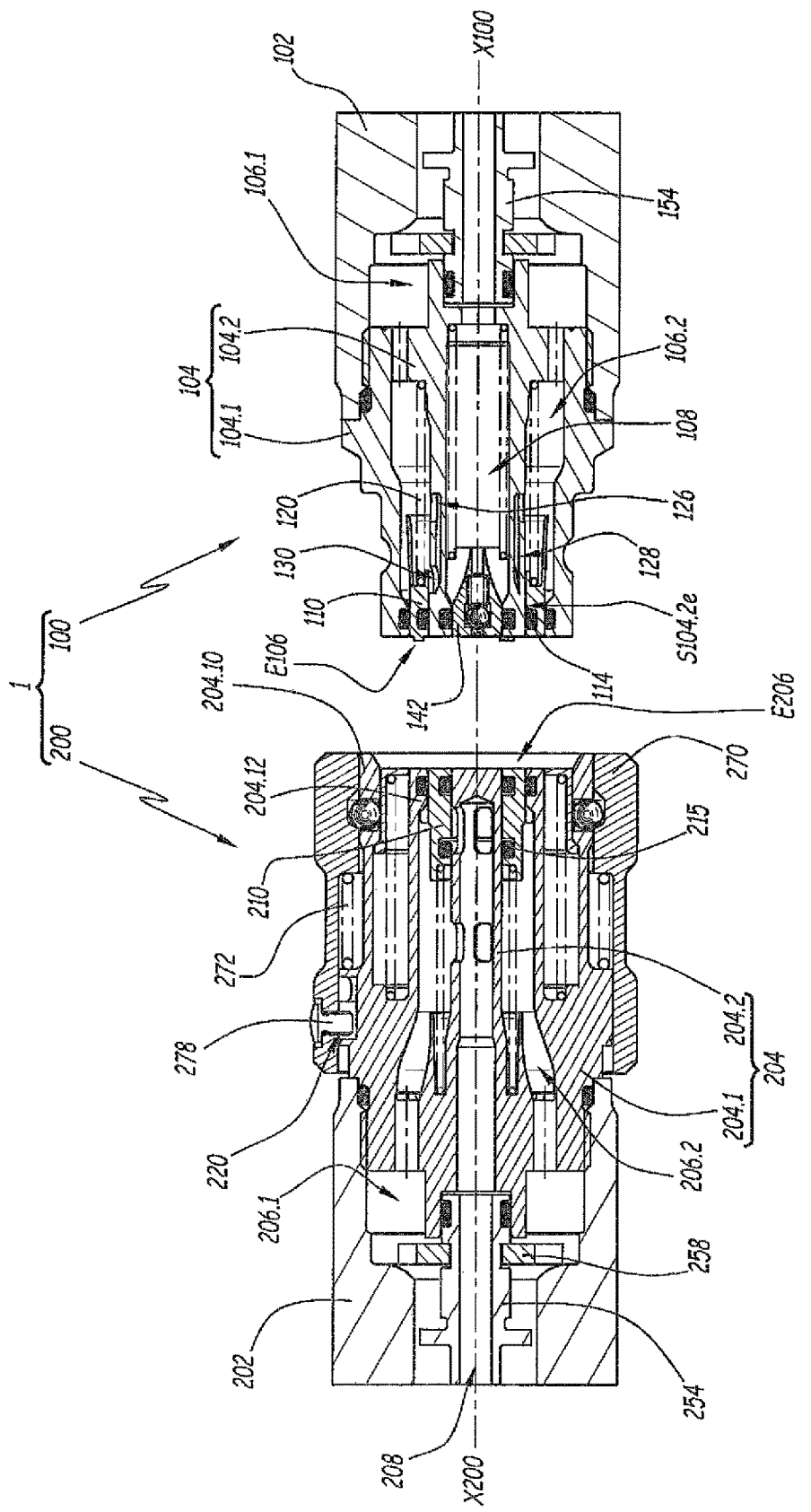
Figure 6:
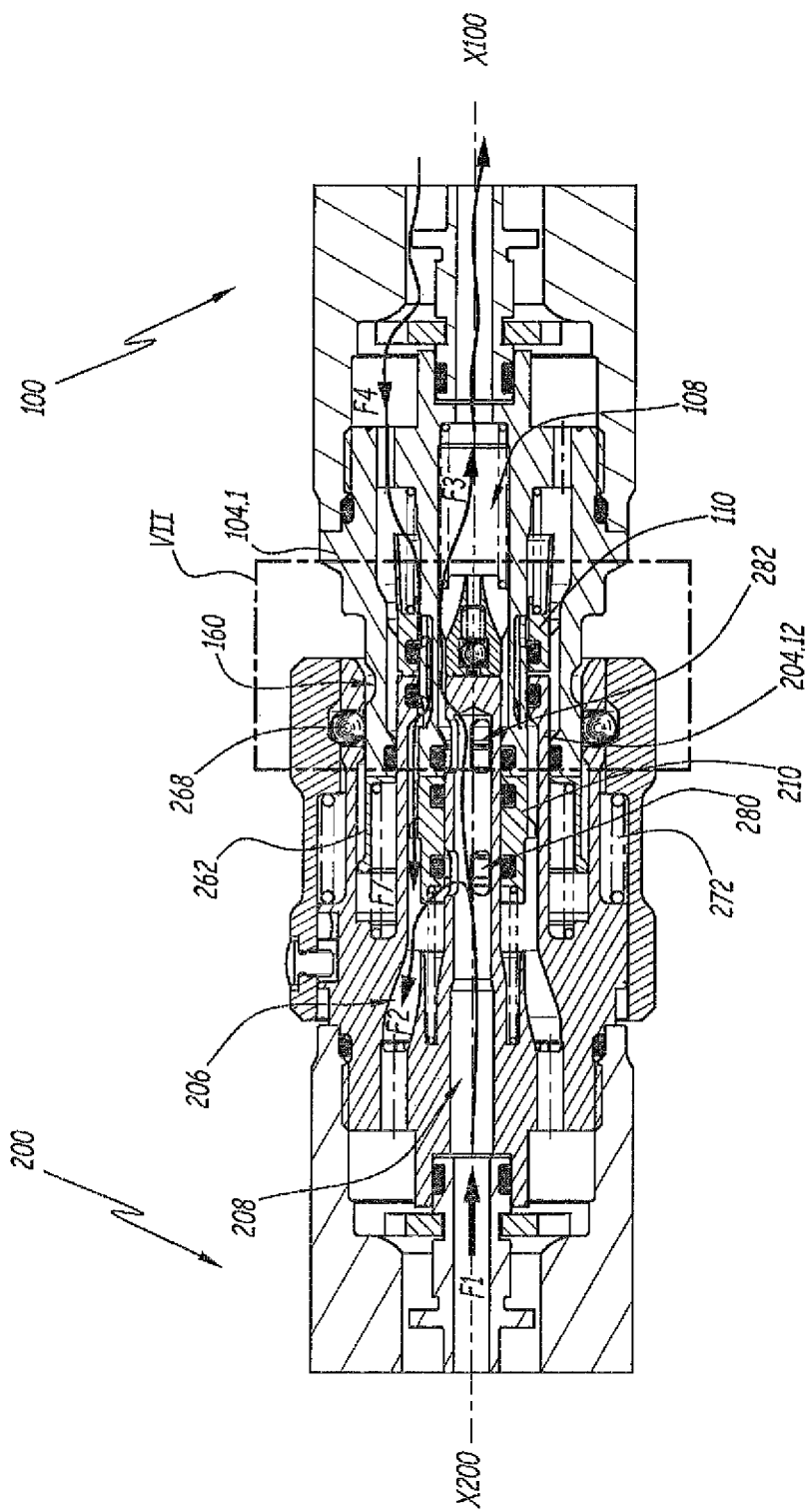
Figure 7:
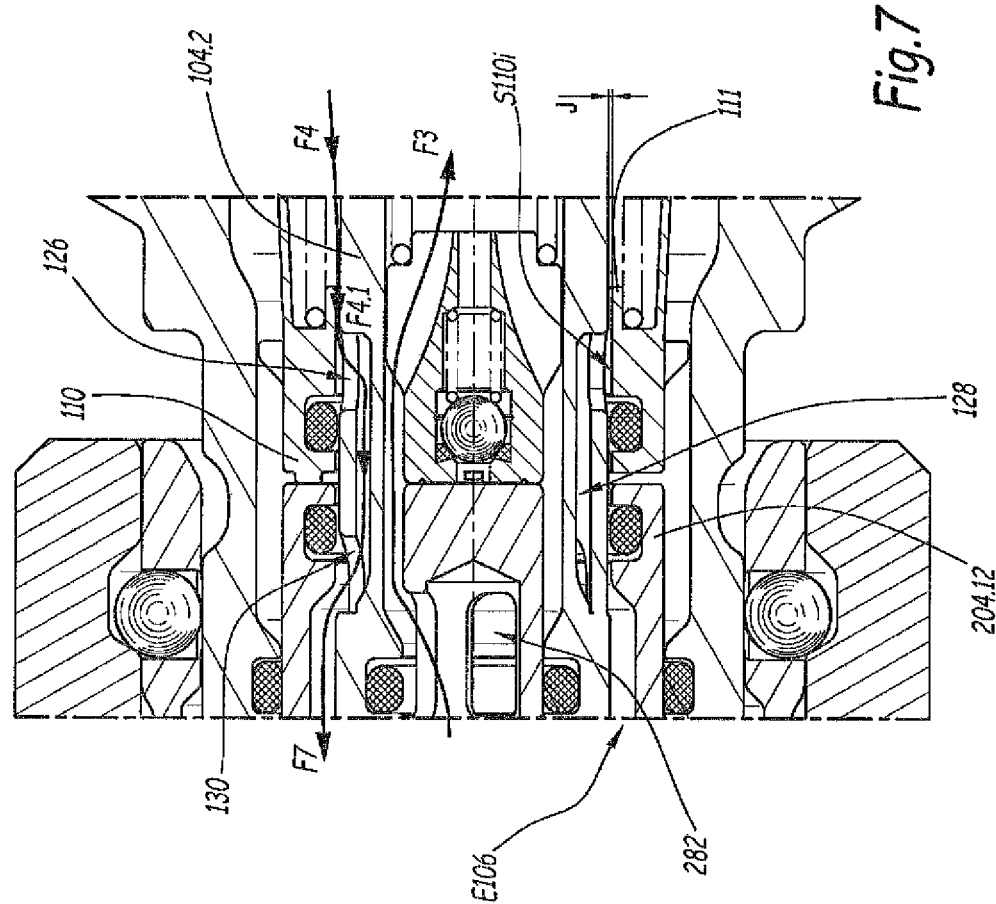
Figure 8:
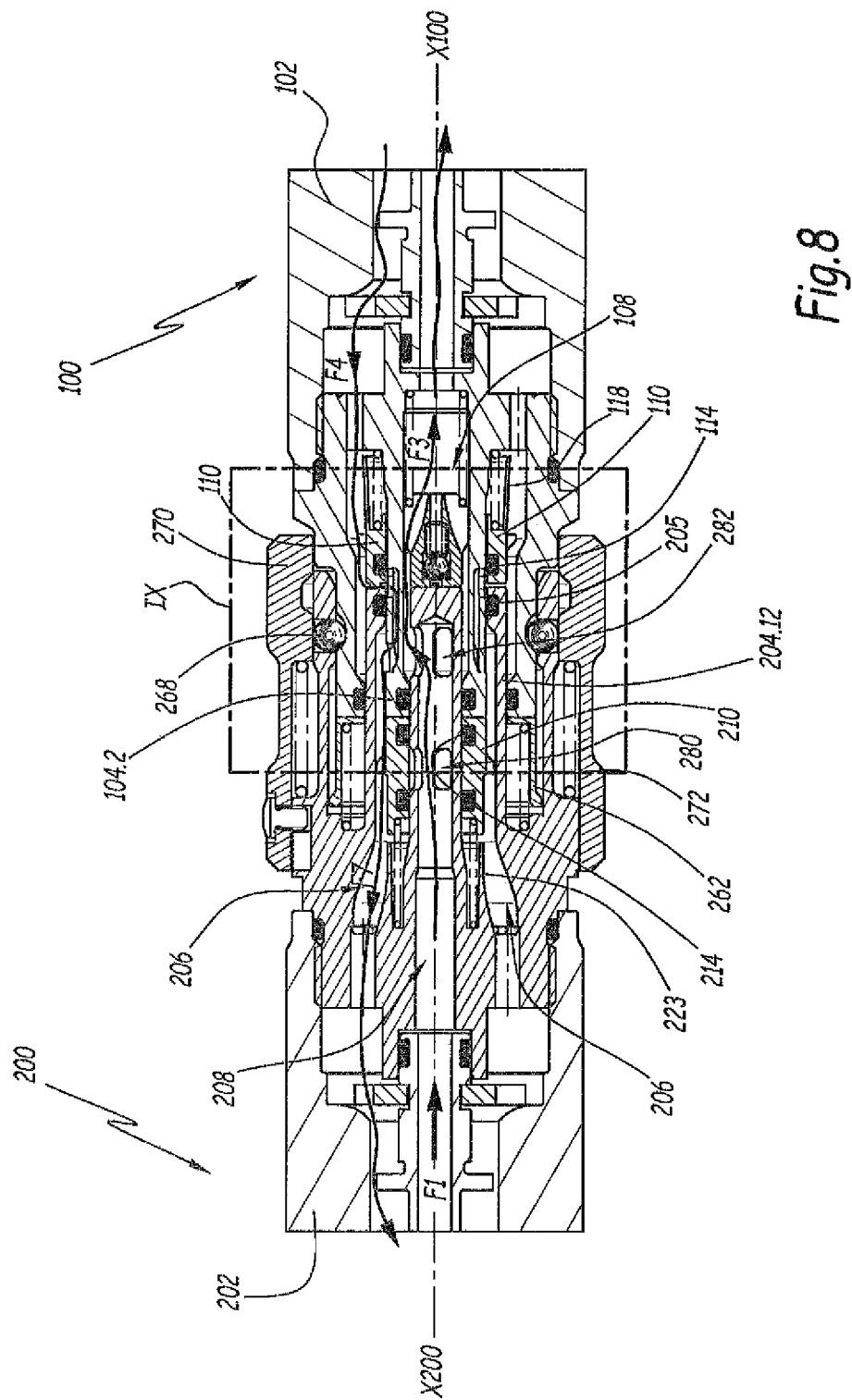
Figure 9:
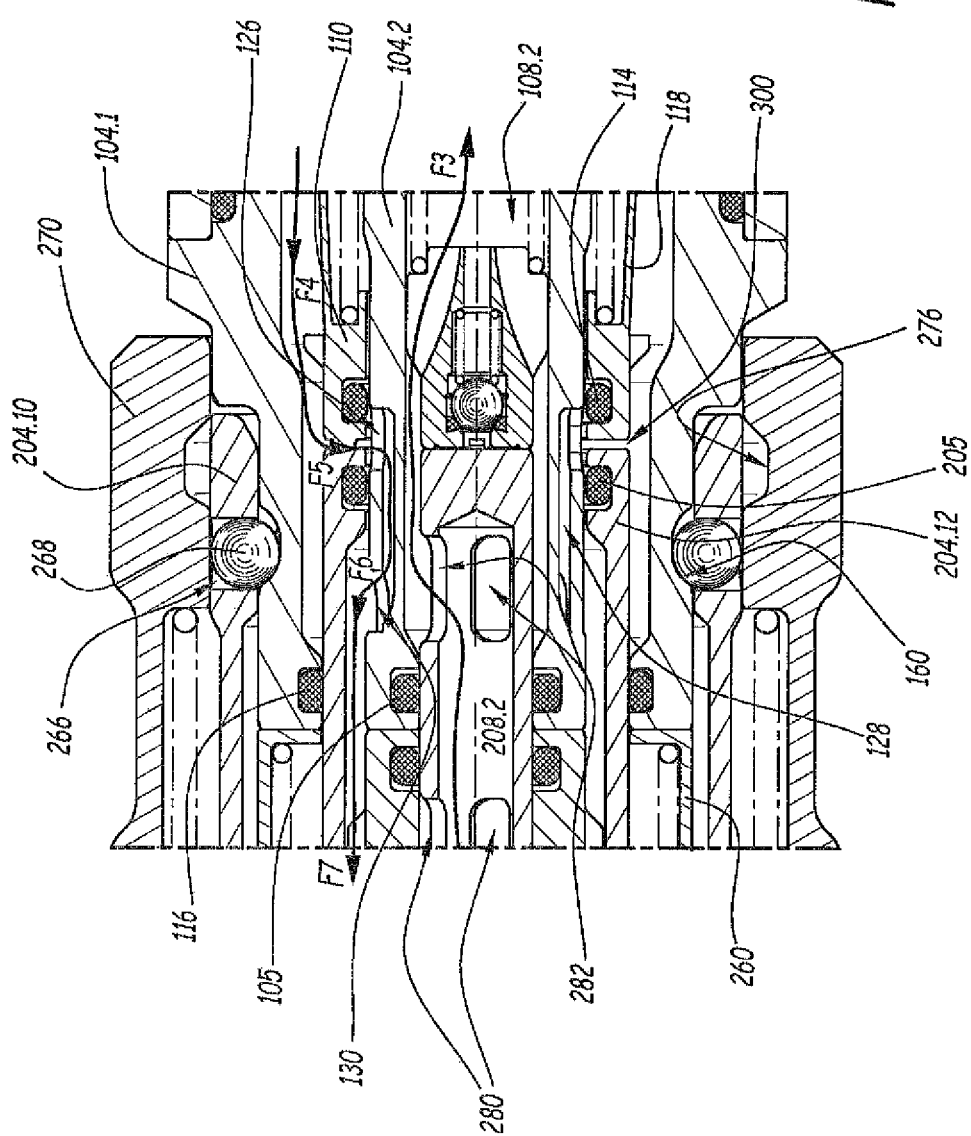
Figure 10:
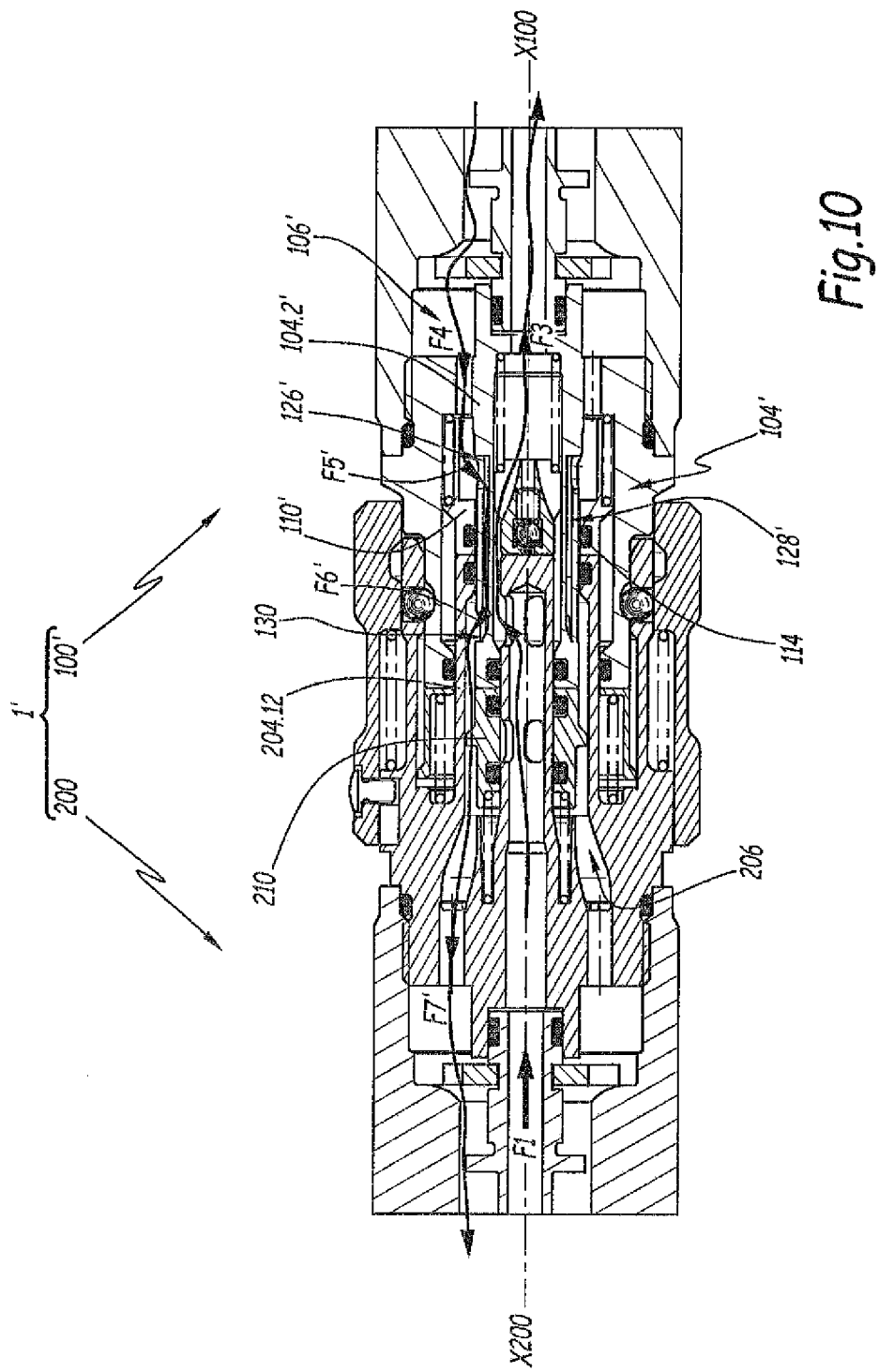
Figure 11:
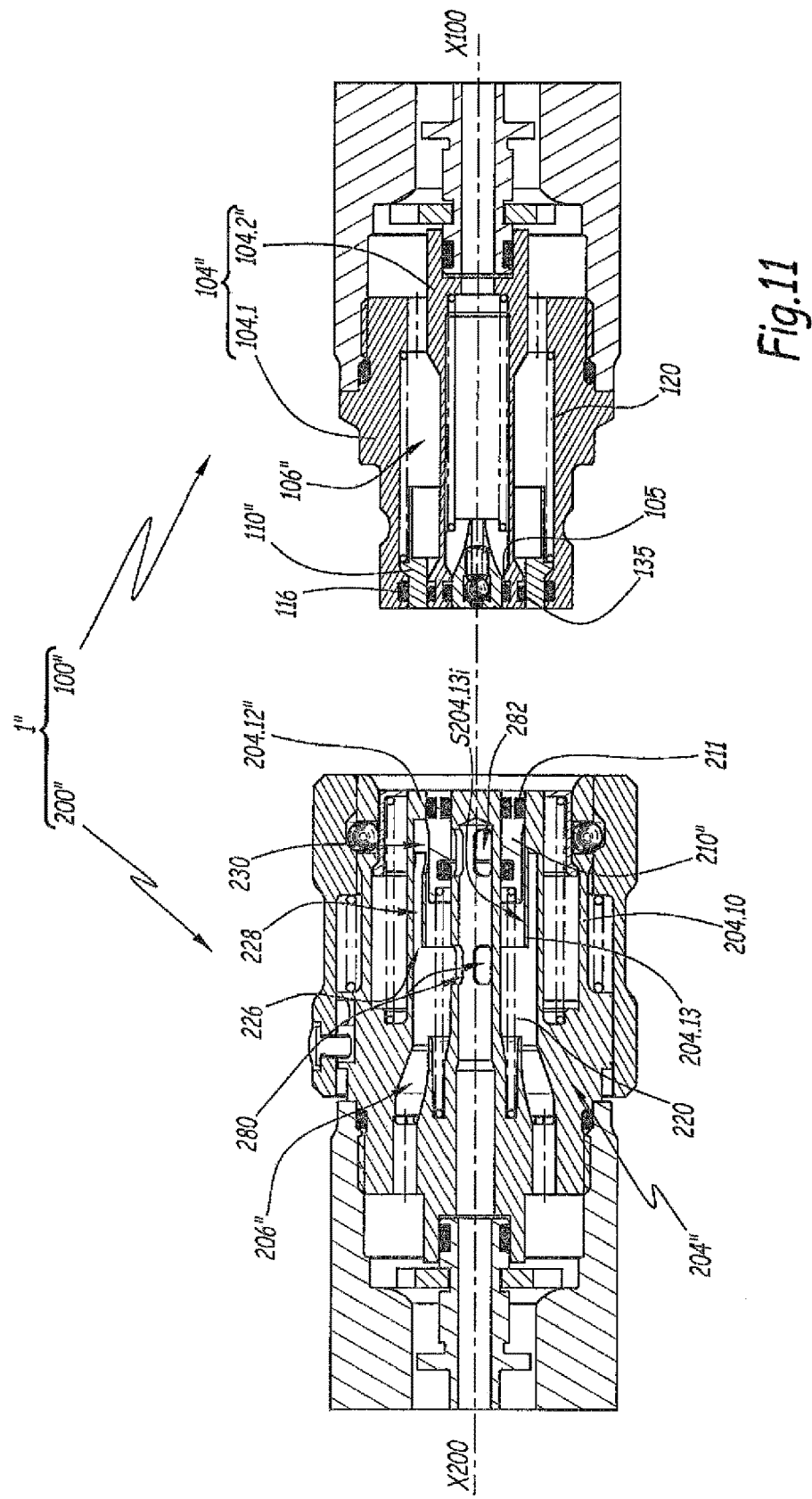
Figure 12:
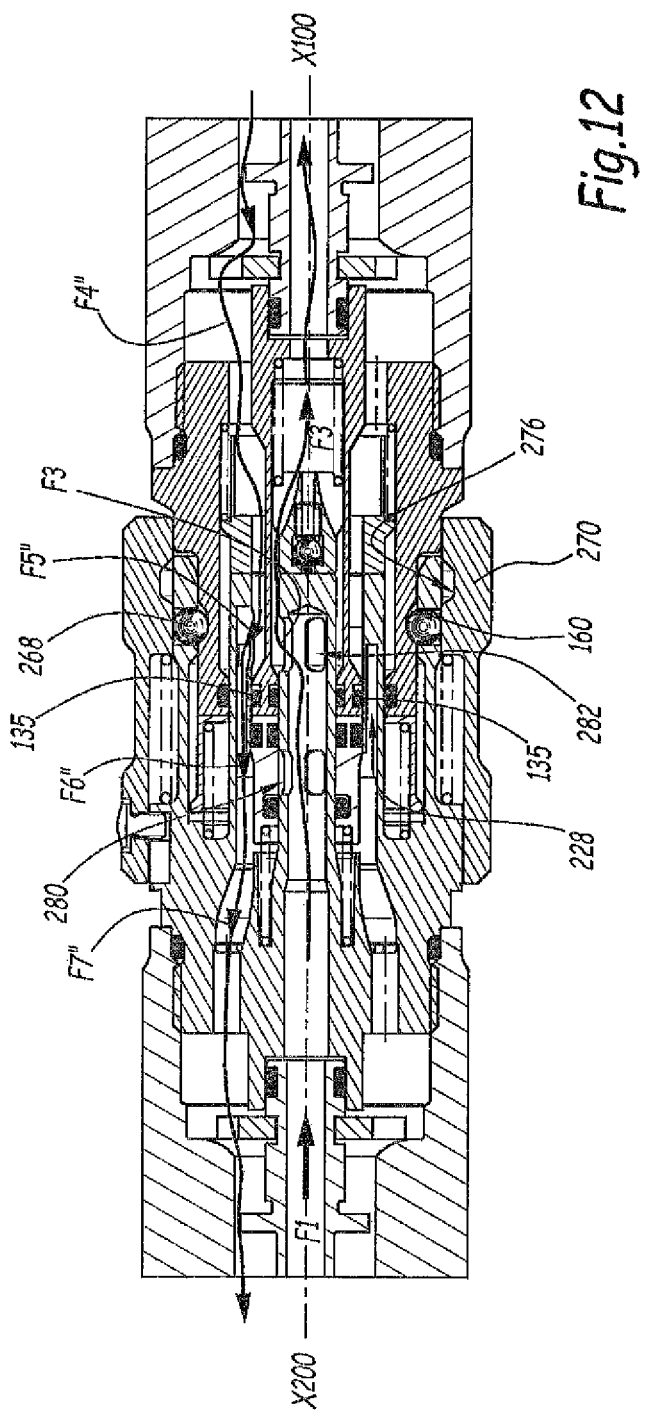

The invention and other advantages thereof will appear more clearly in light of the following description of five embodiments of a connector according to its principle, provided solely as an example and done in reference to the drawings, in which:

FIG. 1 is a perspective view of a connector according to a first embodiment of the invention, shown in the uncoupled position, FIG. 2 is an enlarged view of circle II in FIG. 1, FIG. 3 is a longitudinal sectional view of a male element, belonging to the connector of FIGS. 1 and 2 in the uncoupled position, FIG. 4 is a longitudinal sectional view of the female element, belonging to the connector of FIGS. 1 and 2 in the uncoupled position, FIG. 5 is a longitudinal sectional view of the connector of FIGS. 1 and 2 in the uncoupled position, FIG. 6 is a sectional view similar to FIG. 5, in which the connector is shown in an intermediate position between the uncoupled position and the coupled position, FIG. 7 is an enlarged view of detail VII of FIG. 6, FIG. 8 is a view similar to FIGS. 5 and 6, in which the coupler is shown in the coupled position, FIG. 9 is an enlarged view of detail IX of FIG. 8, FIG. 10 is a longitudinal sectional view, similar to FIG. 8, of a connector according to a second embodiment of the invention, FIGS. 11 and 12 are sectional views similar to FIGS. 5 and 8 of the connector according to a third embodiment of the invention.

Figure 13:
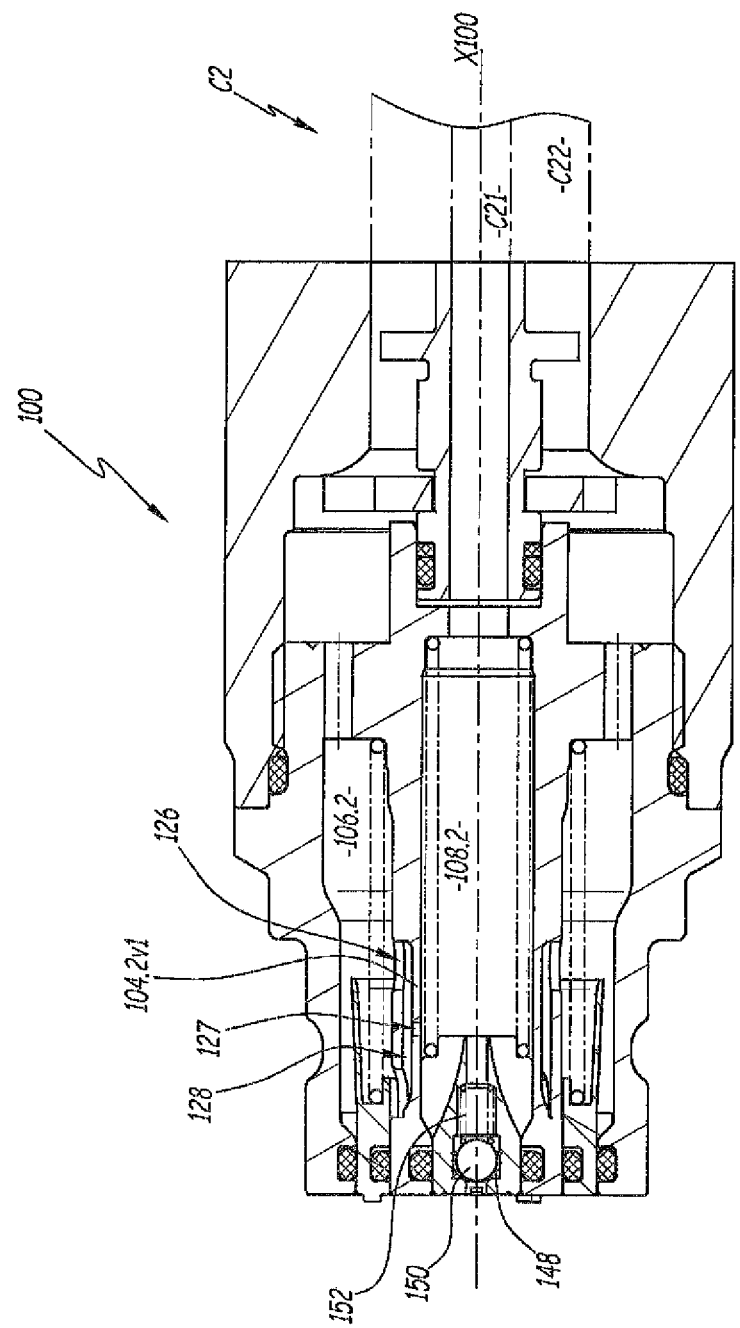
Figure 14:
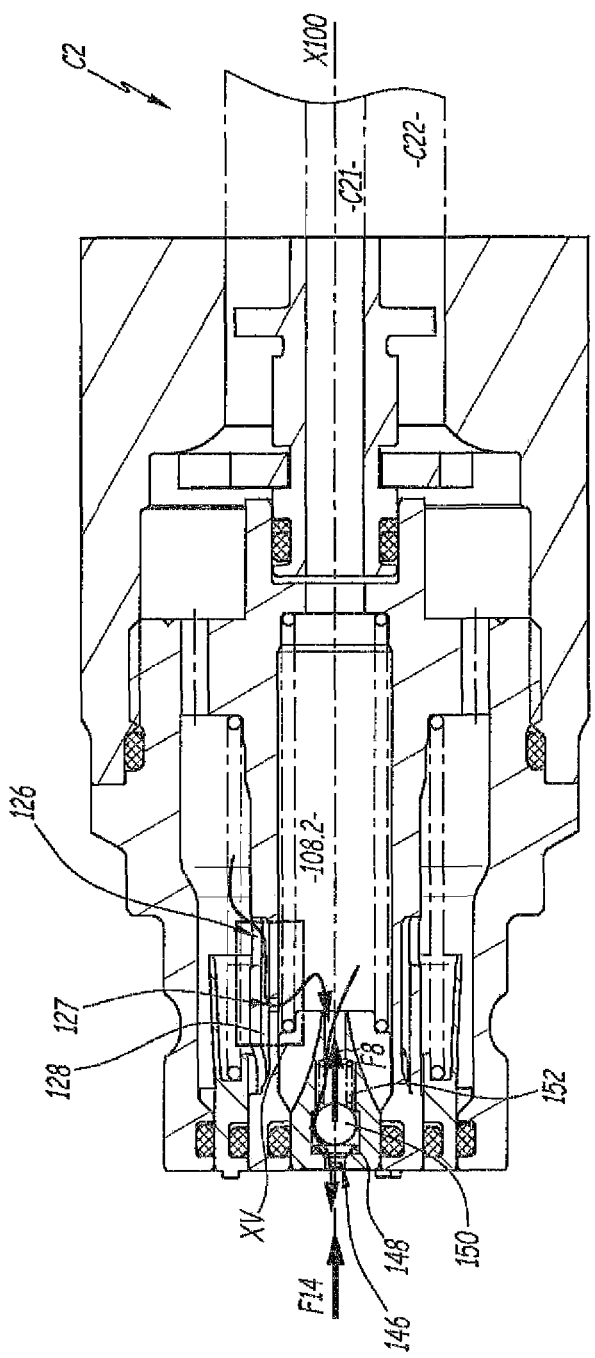
Figure 15:
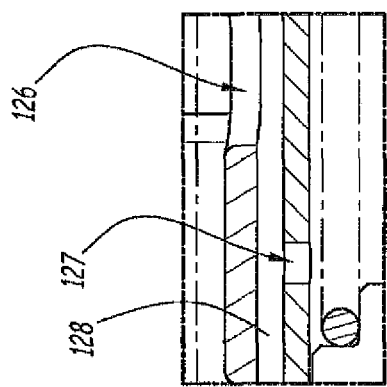

FIG. 13 is a longitudinal sectional view similar to FIG. 3, showing a male element belonging to a connector according to a fourth embodiment of the invention, FIG. 14 is a sectional view similar to FIG. 13, wherein the male element is in a bleed configuration, FIG. 15 is an enlarged view of box XV of FIG. 14, FIG. 16 is a longitudinal sectional view, similar to FIG. 8, of a connector according to a fifth embodiment of the invention, and FIG. 17 is an enlarged view of box XVII of FIG. 16.

FIGS. 1 to 9 show a fluid connector 1 making it possible to connect two lines C1 and C2, shown in mixed lines only in FIGS. 1, 3 and 4, to connect a hydraulic tool (not shown) to a hydraulic pump (not shown). The two lines have a coaxial-type structure and define an inner fluid passage C11 or C21 and an outer fluid passage C21 or C22, annular and coaxially surrounding the inner fluid passage. In practice, an inner fluid passage C11 or C21 corresponds to a high-pressure passage, i.e., a passage for supplying a hydraulic tool, while an outer fluid passage C12 or C22 is a low-pressure passage, which corresponds to the fluid discharged by the hydraulic tool toward a reservoir of the hydraulic pump. The fluid can for example be oil or water, with a high pressure, in particular higher than 300 bar.

The connector 1 comprises a male element 100 suitable for being fastened to an end of the line C2 connected to the tool and a complementary female element 200, suitable for being fastened to an end of the line C1 connected to the pump.

The male element 100 is better visible in FIG. 3. The male element 100 has a geometry of revolution around a central axis X100. In particular, the male element 100 is globally cylindrical, centered on the axis X100.

In the rest of the description, a component of a connector element positioned in front or distally is a component that is oriented toward the complementary connector element in the coupled position of the connector, while a component positioned behind or proximally is a component that is oriented opposite relative to the complementary connector element in the coupled position, i.e., in the direction of the line at the end of which the connector element is mounted. Furthermore, for a considered connector element, the axial, radial, centripetal and centrifugal directions must be interpreted relative to the central axis of the connector element. Thus, the axial direction of the male element 100 with the female element 200 is parallel to the central axis X100 or X200 of the element in question.

The male element 100 comprises a rear body 102 that is tubular and centered on the axis X100. A tube 154 is positioned inside the body 102. That tube 154 is axially immobilized by a fixed staple 158. More specifically, the tube 154 includes a peripheral slot 156 in which the staple 158 is engaged. The staple 158 therefore at least partially surrounds the tube 154. The overlapping of the staple 158 around the tube 154 means that staple 158 and the tube 154 are axially secured to one another.

The rear body 102 includes, in front, a tapping 136 inside which a front body 104 is screwed. To that end, the body 104 includes, behind, a threaded part 134 having a screw pitch complementary to that of the tapping 136.

The front body 104 comprises two coaxial parts 104.1 and 104.2 that have a globally tubular geometry centered on the axis X100. The coaxial parts 104.1 and 104.2 respectively form an outer coaxial part and an inner coaxial part of the body 104. The front end of the rear tube 154 is engaged in the inner coaxial part 104.2 of the body 104. The tube 154 is therefore partially fitted in the body 104. The body 104 also delimits through holes 132 defined behind the body 104. The holes 132 extend parallel to the axis X100 and are distributed regularly around the axis X100.

The male element 100 defines an inner fluid passage 108, which extends axially through the male element 100. More specifically, the inner passage 108 comprises a first segment 108.1 defined inside the tube 154 and a second segment 108.2 defined inside the inner coaxial part 104.2 of the body 104.

The male element 100 also comprises an outer fluid passage 106 that surrounds the inner passage 108 through the male element 100. The outer passage 106 comprises a first segment 106.1 defined between the tube 154 and the body 102 and a second segment 106.2 defined between the coaxial parts 104.1 and 104.2 of the body 104. These first and second segments 106.1 and 106.2 are connected by the axial holes 132 of the body 104. The outer passage 106 comprises a distal mouth E106, corresponding to the annular orifice defined between the distal ends of the coaxial parts 104.1 and 104.2. The passages 108 and 106 are coaxial.

The outer part 104.1 of the body 104 includes an outer radial surface S104.1e that is provided with a circular peripheral housing 160, i.e., a groove, around the axis X100. The outer coaxial part 104.1 also includes an inner radial surface S104.1i that defines, in front, a housing for receiving an inner sealing gasket 116. This housing is an inner peripheral groove of the outer coaxial part 104.1.

The inner coaxial part 104.2 of the front body 104 includes an outer radial surface S104.2e and an inner radial surface S104.2i. The inner radial surface S104.2i defines, in front, a housing for receiving an inner sealing gasket 105. This housing is an inner peripheral groove of the inner coaxial part 104.2.

The inner coaxial part 104.2 of the front body 104 includes a segment 104.2t having a double skin formed by an inner radial partition 104.2v1 and an outer radial partition 104.2v2. The inner coaxial part 104.2 of the front body 104 therefore delimits an annular passage 128, which is defined between the two skins 104.2v1 and 104.2v2 of that segment 104.2t. More specifically, the outer radial surface S104.2e includes a series of proximal openings 126 and a series of distal openings 130. The openings 126 and 130 are radial holes crossing through the outer radial partition 104.2v2 of the segment 104.2t. The openings 126 and 130 are distributed regularly around the axis X100 and are positioned behind relative to the sealing gasket 105. The openings 130 are distributed around the axis X100 advantageously along a same plane normal to the axis. The openings 126 and 130 each emerge in the annular passage 128. The annular passage 128 extends axially between the openings 126 and 130. The passage 128 therefore forms a bypass tunnel for the outer passage 106.

A male drawer 110 is positioned coaxially between the parts 104.1 and 104.2, i.e., in the outer passage 106. This drawer 110 is axially movable and is subject to an elastic force oriented forward, which is generated by a spring 120. This spring 120 extends between a shoulder 122 of the male drawer 110 and a shoulder 124 defined on the rear of the inner coaxial part 104.2. Furthermore, the drawer 110 comprises, behind, a skirt 118 that surrounds part of the spring 120. In the example, this skirt 118 is a single piece, but it may also be screwed, or attached in another manner, on the rest of the drawer 110.

The drawer 110 defines an outer radial surface S110e and an inner radial surface S110i. The inner radial surface S110i defines, in front, a housing for receiving an inner sealing gasket 114. This housing is an inner peripheral groove of the drawer 110.

In the uncoupled position, the inner seal 114 is positioned in front of each distal opening 130. The front outer face of the drawer 110, which is perpendicular to the central axis X100 of the male element 100, includes lugs 112 that protrude forward relative to the rest of the drawer 110. There are three of these lugs 112, and they are regularly distributed around the axis X100. As shown in FIG. 2, the lugs 112 protrude relative to the front face of the male element 100.

A central valve 140 is positioned inside the inner coaxial part 104.2 of the front body 104. In the uncoupled position, the valve 140 is positioned at the front end of the element 100. It comprises a valve body 142 provided, at the rear, with a series of wide fins 144 between which the fluid can flow. The valve body 142 is hollow, i.e., it defines an axial opening arranged between two orifices, among which the front orifice is referenced 146. The valve body 142 comprises a cavity for receiving a bleed member, such as a shutter 150. In the example, the shutter 150 is a bead. When the valve 140 is closed, the bead 150 bears tightly against a distal mouth of the inner passageway 108, in particular against a sealing gasket 148 positioned in contact with an inner shoulder of the valve body 142. The shutter 150 is subject to an elastic force oriented forward and generated by a spring 152 inserted between the shutter 150 and an inner shoulder arranged behind the valve body 142.

The valve 140 is also a bleed tool that makes it possible, by pushing a tool into the orifice 146, to axially move the shutter 150 backward, against the elastic force of the spring 152, to bleed the fluid flowing in the inner passage 108 of the male element 100. This results in decreasing the residual pressure in the inner fluid passage C21, therefore in the tool. This bleed step can be carried out before the coupling to facilitate the pushing back of the valve 140. The connection operation then requires less force from the operator.

The valve 140 is axially movable inside the inner passage 108. It is subject to an elastic force oriented forward, which is generated by a spring 162 inserted between a shoulder arranged on the fins 144 and an inner radial shoulder 164 formed behind the inner coaxial part 104.2.

In the uncoupled position, i.e., in the position of FIGS. 1 to 3 and 5, the male drawer 110 tightly closes off the distal mouth E106 of the outer passage 106. The tightness is ensured on the one hand by the seal 114 of the drawer 110, which bears tightly against the outer radial surface S104.2e of the inner coaxial part 104.2, and on the other hand by the inner sealing gasket 116, which bears tightly against the outer radial surface S110e of the drawer 110.

Furthermore, the valve 140 tightly closes the inner passage 108 in the uncoupled position of the male element 100. More specifically, the passage 108 is tightly closed by cooperation between the valve body 142 and the inner coaxial part 104.2 of the front body 104, since the inner sealing gasket 105 supported by the inner coaxial part 104.2 bears tightly against the outer surface of the valve body 142.

The female element 200 is better shown in FIG. 4. The female element 200 has a geometry of revolution around a central axis X200. In particular, the female element 200 is globally cylindrical and centered on the axis X200.

The female element 200 comprises a rear body 202 that is tubular and centered on the axis X200. A tube 254 is positioned inside the body 202. Said tube 254 is axially immobilized by a fixed staple 258. More specifically, the tube 254 includes a peripheral slot 256 in which the staple 258 is engaged. The staple 258 therefore at least partially surrounds the tube 254. The overlapping of the staple 258 around the tube 254 means that the staple 258 and the tube 254 are axially secured to one another.

In front, the rear body 202 includes a tapping 236 inside which a front body 204 is screwed. To that end, the body 204 includes, behind, a threaded part 234 having a screw pitch complementary to that of the tapping 236.

The front body 204 comprises two coaxial parts 204.1 and 204.2 that have a globally tubular geometry centered on the axis X200. The coaxial parts 204.1 and 204.2 respectively form an outer coaxial part and an inner coaxial part of the body 204. The front end of the rear tube 254 is engaged in the inner coaxial part 204.2 of the body 204. The tube 254 is therefore partially fitted in the body 204. The body 204 also delimits through holes 232 defined behind the body 204.

The holes 232 extend parallel to the axis X200 and are distributed regularly around the axis X200.

The female element 200 comprises an inner fluid passage 208, which extends axially through the female element 200. More specifically, the inner passage 208 comprises a first segment 208.1 defined inside the tube 254 and a second segment 208.2 defined inside the inner coaxial part 204.2 of the body 204.

The female element 200 also comprises an outer fluid passage 206, which surrounds the inner passage 208 through the female element 200. The outer passage 206 comprises a first segment 206.1 defined between the tube 254 and the body 202 and a second segment 206.2 defined between the coaxial parts 204.1 and 204.2 of the body 204. The first and second segments 206.1 and 206.2 are connected by the axial holes 232 of the body 204. The outer passage 206 comprises a distal mouth E206, corresponding to the annular orifice defined between the distal ends of the coaxial parts 204.1 and 204.2. The passages 208 and 206 are coaxial.

The inner passages 108 and 208 of the elements 100 and 200, respectively, form the outgoing path for the fluid going from the pump to the tool, while the outer passages 106, 206 and the connecting passage 128 form the return path for the fluid going from the tool to the reservoir of the pump. Thus, in the outgoing direction, the fluid flows from the female element 200 to the male element 100, and conversely upon return.

The outer coaxial part 204.1 of the body 204 comprises two coaxial bushes 204.10 and 204.12 that extend axially forward, the bush 204.10 surrounding the bush 204.12. The outer bush 204.10 defines an outer radial surface S204.10e. The bush 204.10 includes, in front, through radial holes 266 in which locking beads 268 are housed. In the uncoupled position, the locking beads 268 protrude radially outward relative to the outer radial surface S204.10e of the bush 204.10.

The bush 204.12 includes an inner radial surface S204.12i. A housing for receiving an inner sealing gasket 205 is defined in front of the inner radial surface S204.12i of the bush 204.12. This housing is an inner peripheral groove of the bush 204.10.

The inner coaxial part 204.2 of the body 204 is closed at its front end. It includes a series of proximal openings 280 and a series of distal openings 282. The openings 280 and 282 are through radial holes that are distributed regularly around the axis X200.

In the uncoupled position, the proximal openings 280 ensure communication between the outer passage 206 and the inner passage 208 of the female element 200. This corresponds to a bypass function. Thus, the female element 200 can be fastened to a line C1 in which there is an operating pressure, i.e., in which the fluid flows in a loop in the inner C11 and outer C12 passages of the line. The pump connected to the hose on which the female element 200 is fixed can therefore operate without the tool being connected.

A female drawer 210 is axially movable around the inner coaxial part 204.2 of the body 204, i.e., inside the outer passage 206. This drawer 210 includes an inner radial surface S210.i and an outer radial surface S210.e. Two receiving housings for inner sealing gaskets 214 and 215 are defined on the inner radial surface S210.i of the female drawer 210, the sealing gasket 214 being positioned in front relative to the sealing gasket 215. These housings are formed by inner peripheral grooves of the drawer 210. The female drawer 210 is subject to the elastic force oriented forward, which is generated by a spring 220 inserted between a rear shoulder 222 of the female drawer 210 and an annular slot 224 arranged in the rear part of the inner coaxial part 204.2 of the body 204.

A memory ring 260 is positioned coaxially between the bushes 204.10 and 204.12 of the outer coaxial part 204.1. This memory ring 260 comprises an inner radial shoulder 262 positioned at the front end of the memory ring 260. The memory ring 260 is axially movable and is subject to an elastic force oriented forward, which is generated by a spring 264 inserted between the shoulder 262 and a rear portion of the outer coaxial part 204.1. In the uncoupled position, the memory ring 260 radially and inwardly covers the locking beads 268. To that end, the memory ring 260 includes an outer radial surface S260e that is in contact with the locking beads 268 in the uncoupled position.

The female element 200 also includes a locking ring 270, which is arranged coaxially around the outer coaxial part 204.1 of the body 204. This locking ring 270 is axially movable and is subject to an elastic axial force oriented forward, which is generated by a spring 272 inserted between a shoulder 274 of the ring 270 and the outer coaxial part 204.1 of the body 204. The locking ring 270 includes an inner radial surface on which an inner housing 276, i.e., a groove, is defined, in front, for receiving the locking beads 268. In the uncoupled position, the beads 268 are housed in the groove 276, such that they oppose the movement of the ring 270 forward, under the elastic force of the spring 272.

In the uncoupled position, the distal mouth E206 of the outer passage 206 is tightly closed off by the female drawer 210. Indeed, the sealing gasket 214 of the female drawer 210 bears tightly against the outer radial surface S204.2e of the part 204.2, the drawer 210 covers the radial openings 282, and the inner sealing gasket 205 of the body 204 bears tightly against the outer radial surface S210e of the drawer 210.

During coupling, the male element 100 should be aligned with the female element 200. This configuration is shown in FIG. 5. In this configuration, the axes X100 and X200 are combined. The operator next pushes the male element 100 into the female element 200.

During this coupling phase, the outer coaxial part 104.1 of the body 104 axially pushes the memory ring 260 backward, against the elastic force of the spring 264, and the inner coaxial part 104.2 of the body 104 pushes the female drawer 200 backward, against the elastic force of the spring 220. Furthermore, the male drawer 100 is pushed back by the bush 204.12 of the outer coaxial part 204.1. More specifically, the male drawer 110 is pushed backward against the elastic force of the spring 120. The pushing of the male 110 and female 210 drawers is also done against the internal pressure forces exerted in the same direction as the respective springs 120 and 220 upon coupling. Here, it is the lugs 112 that come into contact with the female body 204. Lastly, the valve 140 is pushed back by the inner coaxial part 204.2 of the female body 204. More specifically, the valve 140 is pushed backward, against the elastic force of the spring 162.

The connector therefore goes from its uncoupled position of FIG. 5 to an intermediate position shown in FIG. 6. In this intermediate position, the male and female elements are not completely coupled. However, the male element 100 is pushed sufficiently inside the female element 200 to place the inner passages 108 and 208 of the elements 100 and 200, respectively, in communication. Consequently, part of the fluid flowing in the inner passage 208 of the female element 200, along the arrow F1, joins the inner passage 106 of the male element 100, as shown by arrow F3. More specifically, by withdrawing, the drawer 210 ceases to cover the distal openings 282 of the part 204.2 and the withdrawal of the valve 140 causes breaking of the sealing at the seal 105. The fluid can thus reach the male element 100 by passing radially in the distal openings 182, then axially between the valve body 142 and the inner coaxial part 104.1 of the male body 104.

In the intermediate position, the female drawer 210 is not withdrawn enough to tightly close off the proximal openings 280 formed in the inner coaxial part 204.2 of the female body 204. Consequently, the fluid flowing in the inner passage 208 of the female element 200, along the arrow F1, can again escape, through the openings 280, toward the outer passage 206, as shown by arrow F2. The fluid then returns toward the reservoir of the pump. More specifically, the fluid discharged at a low pressure flows in the outer passage C22 of the line C2, then in the outer passage 106 of the male element 100.

As better shown in FIG. 7, the fluid next escapes, along arrow F4.1, through an annular space defined between proximal part 111 of the drawer 110 and the outer surface S104.2e of the inner part 104.2 of the male body. Radial play J is in fact present between the proximal part 111 of the drawer 110 and the outer surface S104.2e of the part 104.2. The fluid then reaches the annular passage 128 and flows in the latter, along arrow F6, until it reaches the distal openings 130, through which it can escape. The fluid lastly reaches the outer passage 206 of the female element 200 by passing through the distal mouth E106, as shown by arrow F7. The male drawer 110 therefore does not oppose the passage of the fluid in the mouth E106 of the outer passage 106 in the intermediate position.

It will be noted that the sealing gaskets 116, 114 and 214 are not directly exposed to the passage of the fluid in that position and that the communication between the outer passages 106 and 206 and between the inner passages 108 and 208 occurs simultaneously. This intermediate position corresponds to an "all communicating" position, since all of the fluid passage ducts communicate with one another.

By pushing the male element 100 further into the female element 200, the connector 1 goes from the intermediate position shown in FIG. 6 to a completely coupled position shown in FIG. 8 or 9, where the return path is bypassed relative to the intermediate position previously described.

In the coupled position, the peripheral housing 160 defined on the outer radial surface S104.1e of the outer coaxial part 104.1 has come radially across from the locking beads 268, which results in moving the locking beads 268 in the peripheral housing 160. Furthermore, the locking beads 268 leave the inner housing 276 of the ring 270 and move in the housing 160 following a centripetal movement relative to the axis X200. The locking beads 268 then cease to protrude outwardly relative to the outer radial surface S204.10e of the bush 204.10. The beads 268 then no longer oppose the advance of the ring 270 under the elastic force of the spring 272. Consequently, the locking ring 270 advances and radially and outwardly covers the locking beads 268. The locking beads 268 are then jammed in the housings 160 and 266 by the inner radial surface of the ring 270. The locking beads 268 therefore make it possible to axially secure the bush 204.10 of the outer coaxial part 204.1 of the female body 204 with the outer coaxial part 104.1 of the male body 104. This makes it possible to ensure locking of the connector 1 in the coupled position, i.e., to prevent uncoupling of the connector 1 simply by moving the two connector elements 100 and 200 further away from one another. In other words, the connector 1 cannot be uncoupled without a positive action by the operator, consisting of unlocking the coupler 1.

In the coupled position, the inner radial seal 114 of the drawer 110 is positioned behind each distal opening 130 and the distal end face of the male drawer 110 is located at the same axial level as the proximal openings 126 arranged in the inner coaxial part 104.2 of the male body 104. Thus, the fluid flowing in the return direction the outer passage 106, along arrow F4, passes around the drawer 110 and escapes through the annular passage 128 while passing centripetally between the lugs 112 of the drawer 110, as shown by arrow F5 in FIG. 9. More specifically, the fluid passes radially in an annular slit 300, defined between the drawer 100 and the bush 204.12 of the outer coaxial part 204.1 of the female body 204 and the axial thickness of which is equal to the axial length of the lugs 112. From there, it crosses through the proximal openings 126 and penetrates the annular passage 128. In the coupled position, the male drawer 110 and the female body 204 therefore form, at their front faces, a radial fluid passage between the outer passage 106 of the male element and the annular passage 128. This radial fluid passage is defined peripherally between the lugs 112. This preferably makes it possible to prevent the fluid from radially crossing the turns of the return spring 120 of the male drawer 110.

The fluid next flows toward the front of the male element 100, in the annular passage 128, as shown by arrow F6, to reach the distal openings 130 and escape in the distal mouth E106, i.e., around the inner coaxial part 104.2 of the male body 104.

In the coupled position, the drawers 110 and 210 therefore no longer oppose the passage of the fluid in the distal mouths E106 and E206, respectively, of the outer passages 106 and 206. In this position, the outer passages 106 and 206 of the male and female elements 100 and 200, respectively, communicate with one another. The annular passage 128 therefore forms a connecting passage between the outer passages 106 and 206 of the elements 100 and 200, respectively. This connecting passage 128 therefore does not belong to the outer passage 106 or the outer passage 206.

In parallel, in the coupled phase, the female drawer 210 is withdrawn enough to tightly close off the proximal openings 280 formed in the inner coaxial part 204.2 of the female body 204. The female drawer 210 therefore cuts the direct communication between the inner and outer passages 208 and 206, respectively, of the female element 200.

The fluid leaving the annular passage 128 therefore flows, in the outer passage 206, as shown by arrow F7.

As shown in FIG. 8 when the connector 1 is in the coupled position, the sealing gaskets 116, 114 and 205 are not directly exposed to the passage of the fluid in the outer tunnel, formed by the junction of the outer passages 108 and 208 of the male and female elements 100 and 200, respectively. In fact, in the coupled position, the sealing gaskets 116, 114 and 205 are respectively pressed against the outer radial surface S204.12e of the bush 204.12 and against the outer radial surface S104.2e of the inner coaxial part 104.2 of the male body 104. In this way, the seals 116, 114 and 205 are kept inside their respective housings, such that they do not risk being damaged by the passage of the fluid in the outer tunnel of the connector 1. The risk of a sealing gasket leaving its housing is therefore limited.

Furthermore, in the coupled position, the sealing gasket 205 of the outer coaxial part 204.1 is in tight contact with the male body 104, between the distal openings 130 and the proximal openings 126. As a result, the seal 205 of the female body is also protected from the passage of fluid in the outer tunnel of the connector.

Furthermore, in the coupled position, the rear end of the skirt 118 of the drawer 110 is positioned near the rear part of the male body 104, radially inside the axial holes 132, such that it guides the fluid leaving the holes 132 over the outside of the drawer 110. The flow is thus facilitated and the passage of the fluid between the turns of the spring 120, and therefore pressure drops, are thus limited.

Likewise, the rear part of the female body 204 also comprises a skirt 223, the front end of which is positioned near the female drawer 210 in the coupled position, such that it guides the fluid toward the axial holes 232 and limits the passage of fluid in the turns of the spring 220.

To uncouple the connector 1, the connector 1 must be unlocked by pulling the locking ring 270 axially toward the rear of the female element 200, so as to bring the inner radial housing 276 radially across from the locking beads 268. The locking beads 268 then move in the housing 276 of the locking ring 270, following a centrifugal movement relative to the axis X200. The locking beads 162 then leave the housing 160 of the male body 104, which results in separating the male body 104 from the female body 204. It is then possible to remove the male element 100 from the female element 200.

Owing to the return springs 220 and 264 of the female element 200, the memory ring 260 and the drawer 210 of the female element automatically return to their uncoupled position due to the separation of the male and female elements. Likewise, the springs 120 and 162 of the male element 100 allow the automatic return of the male drawer 110 and the valve 140 toward their uncoupled position, shown in FIG. 3. The valve 140 then tightly closes off the high-pressure passage 108 of the male element 100. The uncoupling results in successively cutting the communication between the passages 106 and 206 and between the passages 108 and 208. Furthermore, the return of the female drawer 210 forward means that the female drawer 210 no longer closes off the proximal openings 280 arranged in the inner coaxial part 204.2 of the female body 204, such that the inner and outer passages 208 and 206, respectively, of the female element 200 communicate with one another.

During the coupling and uncoupling, the inner surface S110i of the male drawer 110 is in tight contact with the outer surface S104.2e of the inner part 104.2 of the male body. The inner seal 114 of the male drawer 110 therefore remains, at least locally, in contact with the outer surface S104.2e of the inner coaxial part 104.2 during the entire coupling and uncoupling phase. In other words, the inner seal 114 remains in contact with the outer surface S104.2e, at least locally, irrespective of the configuration of the connector.

FIG. 10 shows a second embodiment of the connector 1' according to the invention. In order to be concise, only the differences with respect to the first embodiment shown in FIGS. 1 and 9 are described below. Furthermore, the components of the connector 1' that are identical to those of the connector 1 retain their numerical reference, while the elements that differ from those of the first embodiment have a numerical reference including their original reference, followed by an apostrophe ('). Lastly, the new components bear other numerical references.

In this second embodiment, the proximal openings 126', delimited by the outer skin of the inner coaxial part 104.2' of the male body 104' of the male element 100', are positioned behind the proximal openings 126 of the connector according to the first embodiment. Thus, the proximal openings 126' are positioned behind the seal 114 in the coupled position and the annular passage 128' defined between the openings 126' and 130 is longer than the passage 128 of the connector according to the first embodiment. Furthermore, the male drawer 110' is arranged relative to the body 104' such that the fluid flowing in the outer passage passes inside the male drawer 110' in the coupled position. The drawer 110' does not include lugs on its front end face, such that the contact between the male drawer 110' and the bush 204.12 is an annular contact centered on the axis X100. The inner radial seal 114 of the drawer 110' is positioned in front of each distal opening 130 in the uncoupled position behind each distal opening 130 in the coupled position, such that it is not exposed to the passage of fluid in the outer duct 106 or 206 in the coupled position, or coupling.

The fluid flowing from the female element 200 toward the male element 100' flows in the direction of arrows F1 and F3, as in the first embodiment.

The fluid flowing in the return direction, along arrow F4, in the outer passage 106' of the male element 100' no longer really escapes between the male drawer 110' and the bush 204.12 of the outer coaxial part 204.1 of the female body 204, but flows freely in the openings 126', inside the drawer 110', then in the annular passage 128', as shown by arrow F5'. The fluid next reaches the outer passage 206 of the female element by passing through the openings 130, as shown by arrow F6'. It next flows in the passage 206, as shown by arrow F7'.

Here, the female element 200 is identical to that of the first embodiment.

FIGS. 11 and 12 show a third embodiment of a connector 1" according to the invention. Below, only the elements that differ from the first embodiment are described. Furthermore, the components of the connector 1" that are identical to those of the first embodiment retain their numerical reference, while the different components have a numerical reference including their original numerical reference followed by a double apostrophe ("). Lastly, the new elements relative to the first or second embodiment bear other numerical references.

In the connector 1", the outer coaxial part 104.1 of the front body 104" is identical to that of the first embodiment, but its inner coaxial part 104.2" does not include a double skin. In fact, the connecting passage 228 between the outer passage 106 of the male element 100 and the outer passage 206" of the female element 200" is delimited in the bush 204.12" of the outer coaxial part of the female body 204". Indeed, the bush 204.12" has a double skin. More specifically, the bush 204.12" includes an inner sleeve 204.13 provided with distal radial openings 230. The distal openings 230 are radial through holes distributed regularly around a central axis X200 of the female element 200", advantageously along a same plane normal to the axis. A proximal opening 226 is defined as the annular orifice positioned around the inner sleeve 204.13, at its rear axial end. The connecting passage 228 is therefore defined, around the inner sleeve 204.13, between the distal ends 230 and the proximal opening 226. The openings 226 and 230 each emerge in the outer passage 206".

In this embodiment, the male drawer 110" does not include sealing gaskets or end lugs. However, the inner coaxial part 104.2" of the male body 104" includes two sealing gaskets 105 and 135, which are respectively positioned in housings delimited by the peripheral grooves arranged in the inner and outer radial surfaces of the inner coaxial part 104.2" of the male body 104". In the uncoupled position, the male drawer 110" tightly closes the outer passage 106" by cooperation with the inner radial seal 116 of the outer coaxial part 104.1 and the outer radial seal 135 of the inner coaxial part 104.2".

The female drawer 210" includes an outer sealing gasket 211, which bears against an inner surface S204.13i of the inner sleeve 204.13 in the uncoupled position, in particular in front of each distal opening 230.

During coupling, the inner coaxial part 104.2" of the male body 104" pushes the female drawer 210" backward, against the elastic force of the spring 220. The female drawer 210" then closes the proximal openings 280 formed in the inner coaxial part of the female body 204". The communication between the inner and outer passages of the female element 200" is therefore interrupted. The fluid flowing from the female element 200" toward the male element 100" flows in the direction of arrows F1 and F3, as in the first embodiment. In parallel, the inner coaxial part 104.2" of the male body 104" protrudes from the distal radial openings 230 of the sleeve 204.13, such that the fluid flowing, along arrow F4", in the outer passage 106" of the male element 100" can reach the connecting passage 228 by passing through the openings 230, as shown by arrow F5". More specifically, the outer sealing gasket 135 of the inner coaxial part 104.2" of the male body 104" is positioned in front of the openings 226, in particular against the inner radial surface S204.13i of the sleeve 204.13. The fluid flowing in the outer passage 106" then flows in the annular passage 228, then reaches the outer passage 206" of the female element 200" by passing through the proximal annular opening 226 forming the outlet orifice of the connecting passage 228, as shown by arrow F6". From there, the fluid flows in the passage 206, as shown by arrow F7".

In the coupled position, the outer sealing gasket 211 bears against the inner surface S204.13i of the sleeve 204.13, in particular behind each distal opening 230.

As in the first two embodiments, there are no sealing gaskets exposed to the passage of fluid in the outer tunnel 106" or 206" in the coupled position of the connector 1". In fact, the outer radial seal of the female drawer 210" and the outer radial seal 135 of the inner coaxial part 104.2" of the male body 104" bear against the inner radial surface of the sleeve 204.13 forming the double skin, i.e., they are protected from the passage of fluid. There is therefore no risk of expulsion of the seals due to the passage of the fluid. The sealing gaskets are therefore damaged less, and the leak risk is lower.

During coupling and uncoupling, the outer surface of the female drawer 210" is in tight contact with the inner surface S204.13i of the sleeve 204.13 of the outer part of the female body. The outer seal 211 of the female drawer 210" therefore remains, at least locally, in contact with the inner surface S204.13i during the coupling and uncoupling phases. In other words, the outer seal 211 remains in contact with the inner surface S204.13i, at least locally, irrespective of the configuration of the connector 1".

In FIGS. 6 to 9 and 11, the flows F1, F2 to F7" are each shown by an arrow. In practice, they may be broken down into unit flows, not shown, that flow in parallel in the connector 1, 1' or 1".

When the tool connected to the male element is cut off from the hydraulic distribution circuit, i.e., the pump, a residual pressure remains in the coaxial passages of the male element. This residual pressure comes from the operating phase preceding the disconnection. If the hydraulic tool is stored in the sun, the oil remaining in the coaxial passages of the duct C2 risks expanding under the effect of the heat, which can cause additional pressure forces on the male drawer and the valve body. The bleed tool 140 previously described makes it possible to decrease the residual pressure in the inner passage. However, a residual pressure remains in the low-pressure outer passage, which opposes the withdrawal of the male drawer. The operator must then overcome this residual pressure to couple the connector, which can prove unpleasant. Thus, two improved connectors are described below designed to offset this problem.

FIGS. 13 and 14 show a male element 100 belonging to a connector according to a fourth embodiment of the invention. Only the differences with respect to the first embodiment are described below. The components of the connector of FIGS. 13 and 14 that are identical to those of the first embodiment retain their numerical references, while the different components bear other numerical references.

The male element 100 of FIG. 13 differs from that shown in FIG. 3 in that it further comprises a depressurization passage 127 able to put the inner and outer passages 108 and 106, respectively, of the male element 100 in communication in the uncoupled position of the connector. More specifically, the depressurization passage 127 is a radial opening defined in the inner partition 104.2v1 of the inner coaxial part 104.2 of the male body 104. The depressurization passage 127 emerges in the connecting passage 128 defined by the male body 104. Thus, the inner and outer passages of the male element 100, respectively referenced 108 and 106, are not isolated from one another when the connector is uncoupled, but communicate with one another. This corresponds to a bypass function, comparable to that described above in relation to the female element 200 of the first embodiment.

In the configuration of FIG. 14, the male element 100 is in the bleed phase. A tool, not shown, such as a screwdriver, is inserted through the front orifice 146 of the valve body 142 in the direction of arrow F14, to axially move the shutter 150 backward, i.e., in the direction of arrow F8, against the elastic force of the spring 152, and thus bleed the fluid flowing in the inner passage 108 of the male element 100. This results in decreasing the residual pressure in the inner duct C21 of the lines C2 connected to the male element 100. Additionally, the depressurization passage 127 also makes it possible to bleed the fluid circulating in the outer passage 106 of the male element 100. Indeed, as shown in FIGS. 14 and 15 by the bold arrows, the fluid circulating in the outer passage 106 of the male element 100 rejoins the inner passage 108 through the depressurization passage 127 and is bled through the front orifice 146 of the valve 140. Unlike the embodiment of FIG. 3, the bleed step therefore also makes it possible to decrease the residual pressure in the outer duct C22 of the line C2 connected to the tool. There is then little or no residual pressure in the coaxial passages of the male element, which makes it possible to connect the connector without force.

In an alternative applicable to the forth embodiment, several depressurization passages 127 can be formed in the inner partition 104.2v1 of the inner coaxial part 104.2 of the male body 104. These passages can be distributed around the central axis X100 of the male element 100 and can also be distributed axially along the the connecting passage 128.

FIGS. 16 and 17 show a fifth embodiment of a connector 1" according to the invention. Below, only the elements that differ from the first embodiment are described. Furthermore, the components of the connector 1 that are identical to those of the first embodiment retain their numerical references, while the other components bear other numerical references.

In the connector 1, a depressurization passage 127 is also defined in the inner coaxial part 104.2 of the male body 104. More specifically, this depressurization passage 127 is a radial opening defined behind the connecting passage 128, i.e., behind the proximal openings 126. This depressurization passage 127 is also able to put the inner and outer passages 108 and 106, respectively, of the male element 100 in communication in the uncoupled position of the connector 1. In the coupled position of the connector, the depressurization passage 127 emerges outwardly in the inner space defined by the skirt 118 of the male drawer 110. Advantageously, but optionally, the male element 100 comprises a shutter element 145 positioned to sealably close off the depressurization passage 127 in the coupled position of the connector. In this example, this shutter element 145 is an elastomer O-ring positioned behind the central valve 140. It is kept in a housing defined by the fins 144 by bearing of the valve spring 162. In this embodiment, the inner and outer passages of the male element 100, respectively referenced 108 and 106, are therefore communicating in the uncoupled state of the connector and isolated from one another in the coupled state of the connector.

As an alternative that is not shown, the seal 145 does not completely sealably close off the depressurization passage 127. The seal 145 then simply limits the circulation between the two coaxial passages 108 and 106, respectively, of the male element in the coupled position of the connector 1.

According to another alternative that is not shown, applicable to the fifth embodiment, a moving part different from the valve 140 is used to close the depressurization passage 127 in the coupled state. For example, the moving part can be the male drawer 110, which outwardly covers the passage 127 during coupling.

According to another alternative that is not shown, applicable to the fifth embodiment, the male element comprises means for guiding the translation of the valve 140. These means prevent the valve 140 from rotating around its movement axis X100. They are in particular advantageous when the shutter member 145 is a simple stopper, i.e., when the shutter element 145 does not extend over the entire periphery, since they then guarantee that the shutter element 145 indeed remains radially across from the passage 127.

As an alternative that is not shown, applicable to all embodiments of the invention, a mechanism for locking the connector in the coupled position other than the beads 268 can be used. For example, it is possible to use a bayonet locking mechanism.

According to another alternative that is not shown, applicable to all of the embodiments, the connector can include a number of coaxial fluid passages strictly greater than two. For example, a connector may comprise several coaxial passage stages.

According to another alternative that is not shown, applicable to all of the embodiments, the male or female connector elements can be mounted directly on the tool or on the hydraulic pump.

According to another alternative that is not shown, applicable to all of the embodiments, the lines C11 and C12 and/or C21 and C22 may not have a coaxial structure, but connect rows of parallel supply and return hoses to the connector, so as to emerge in coaxial inner and outer passages. This type of installation configuration, called double line, is still covered by the invention and compatible with the coaxial operation.

According to another alternative that is not shown, applicable to all of the embodiments, the inner coaxial part 102.2 of the front body includes a single proximal opening 126 and a single distal opening 130.

According to another alternative that is not shown, applicable to the first embodiment, the drawer 110 includes a different number of lugs 112, for example two.

According to another alternative that is not shown, applicable to all of the embodiments, the inner coaxial part 204.2 of the body 204 only includes one proximal opening 280 and one distal opening 282.

According to another alternative that is not shown, applicable to all of the embodiments, the coaxial parts of the male body or the coaxial parts of the female body are not adjacent. More generally, the body of the male or female element may not be formed in a single piece, but includes several pieces connected to one another, in particular by screwing. The pieces of the male or female body then jointly delimit a connecting passage between the outer passages of the male and female elements in the coupled phase of the connector 1.

According to another alternative that is not shown, applicable to the first embodiment, the lugs 112 are positioned on the front face of the bush 204.12 of the outer coaxial part 204.1 of the female body 204. This bush 204.12 then defines, with the male drawer 110, a radial fluid passage, which extends peripherally around the axis X100 or X200 between the lugs 112.

According to another alternative that is not shown, applicable to all of the embodiments, the connector may have several rectilinear connecting passages parallel to the axis X100 or X200, which are distributed peripherally around the axis X100 or X200, each between the distal opening and proximal opening, such as a set of parallel channels.

According to another alternative that is not shown, applicable to all of the embodiments, the male element can be mounted on the hose connected to the pump and the female element can be mounted on the hose connected to the tool.

According to another alternative that is not shown, applicable to all of the embodiments, the inner coaxial part 204.2 of the female element 200 is provided with one or more openings, each able to place the inner and outer passages of the female element 200 in communication in the coupled position and place the inner passages 108 and 208 of the two connector elements in communication in the coupled position. Secondarily, the female drawer 210 may position the inner seal 214 on its inner surface, but may no longer have the sealing gasket 215 according to this other alternative.

The technical features of the alternatives and embodiments considered above may be combined with one another to create new embodiments of the invention.

The invention claimed is:

1. A fluid connector for removably joining two lines, comprising a male element that includes:
    a male body, comprising two coaxial parts defining an inner passage and an outer passage, and
    a male drawer, which is axially movable inside the outer passage between an uncoupled position of the fluid connector, where it tightly closes off a distal mouth of the outer passage, and a coupled position, where it does not oppose the passage of fluid in the distal mouth,
and a complementary female element that includes:
    a female body, comprising two coaxial parts defining an inner passage and an outer passage, and
    a female drawer, which is axially movable inside the outer passage between an uncoupled position of the fluid connector, where it tightly closes off a distal mouth of the outer passage, and a coupled position, where it does not oppose the passage of the fluid in the distal mouth, the male drawer and the female drawer respectively being pushed by the female body and by the male body during coupling,
wherein:
    the male body delimits a connecting passage between the outer passage of the female element and the outer passage of the male element during the coupling of the male and female elements, the connecting passage extending between at least one distal opening and at least one proximal opening, which are delimited in an inner coaxial part of the male body and which each emerge in the outer passage of the male element,
    the male drawer includes, on an inner surface, an inner sealing gasket that bears against the outer surface of the inner coaxial part of the male body in the coupled position and in the uncoupled position,
    in the uncoupled position, the inner sealing gasket bears on the male body in front of each distal opening, and
    in the coupled position the inner sealing gasket bears on the male body behind each distal opening,
or wherein:
    the female body delimits a connecting passage between the outer passage of the female element and the outer passage of the male element during the coupling of the elements, the connecting passage extending between at least one distal opening and at least one proximal opening, which are delimited in an outer coaxial part of the female body and which each emerge in the outer passage of the female element,
    the female drawer includes, on an outer surface, an outer sealing gasket that bears against an inner surface of the outer coaxial part of the female body in the coupled and uncoupled positions,
    in the uncoupled position, the outer sealing gasket bears on the female body in front of each distal opening, and
    in the coupled position, the outer sealing gasket bears on the female body behind each distal opening.

2. The fluid connector according to claim 1, wherein, during coupling and uncoupling:
    the inner sealing gasket of the inner surface of the male drawer is in tight contact with the outer surface of the inner coaxial part of the male body, or
    the outer sealing gasket of the outer surface of the female drawer is in tight contact with the inner surface of the outer coaxial part of the female body.

3. The fluid connector according to claim 1, wherein the outer coaxial part of the female body has a distal part equipped, on its inner face, with a sealing gasket that is in contact with the male body in the coupled position, between the proximal and distal openings.

4. The fluid connector according to claim 1, wherein, in the coupled position, the male drawer and the female body form, at their front faces, a radial fluid passage between the outer passage of the male element and the connecting passage.

5. The fluid connector according to claim 4, wherein the front face of the male drawer includes contact lugs configured to contact with the front face of the female body and wherein the radial fluid passage extends peripherally between the contact lugs.

6. The fluid connector according to claim 1, wherein, in the coupled position, the inner sealing gasket of the male drawer bears on the male body behind each distal opening and in front of each proximal opening, and wherein the outer passage of the male element extends inside the male drawer toward the connecting passage.

7. The fluid connector according to claim 1, wherein an inner coaxial part of the female body is provided with at least one distal radial opening able to place the inner passage of the male element in communication with the inner passage of the female element in the coupled position.

8. The fluid connector according to claim 7, wherein the inner coaxial part of the female body is provided with at least one proximal radial opening relative to the distal radial opening, able to put the inner and outer passages of the female element in communication in the uncoupled position.

9. The fluid connector according to claim 8, wherein, during coupling, the female drawer closes off the or each proximal radial opening of the inner coaxial part of the female body and frees the or each distal radial opening of the inner coaxial part of the female body.

10. The fluid connector according to claim 1, wherein an inner coaxial part of the female body is provided with at least one opening, able to place the inner and outer passages of the female element in communication in the uncoupled position and place the inner passages of the male and female elements in communication in the coupled position.

11. The fluid connector according to claim 1, wherein:
the male element further comprises a central valve movable in the inner passage of the male element and having a valve body,
the valve body is in tight contact with the male body in the uncoupled position, and
the tight contact between the valve body and the male body being broken upon coupling.

12. The fluid connector according to claim 1, wherein the male element is equipped with a bleed member, which is elastically kept in tight contact against a distal mouth of the inner passage and which is accessible from an outside environment to free the inner passage to the outside.

13. The fluid connector according to claim 1, wherein the inner coaxial part of the male body defines at least one proximal depressurization passage able to put the inner and outer passages of the male element in communication in the uncoupled position of the fluid connector.

14. The fluid connector according to claim 13, wherein the proximal depressurization passage emerges in the connecting passage defined by the male body.

15. The fluid connector according to claim 13, wherein the male element further comprises a central valve movable in the inner passage of the male element and wherein the central valve closes off the proximal depressurization passage in the coupled position of the fluid connector.

16. The fluid connector according to claim 4, wherein the front face of the female body includes contact lugs configured to contact with the front face of the male drawer and wherein the radial fluid passage extends peripherally between the contact lugs.

* * * * *